United States Patent [19]

Piasecki et al.

[11] 4,071,207
[45] Jan. 31, 1978

[54] VERTICAL TAKE-OFF AIRCRAFT

[75] Inventors: Frank N. Piasecki, Haverford; Donald N. Meyers, Philadelphia, both of Pa.

[73] Assignee: Piasecki Aircraft Corporation, Philadelphia, Pa.

[21] Appl. No.: 611,739

[22] Filed: Sept. 9, 1975

[51] Int. Cl.² .................... B60V 1/11; B64C 15/06
[52] U.S. Cl. .................... 244/23 D; 180/118; 180/120; 244/12.5; 244/83 G
[58] Field of Search ............ 244/12 R, 12 D, 23 R, 244/23 D, 17.23, 17.25, 52, 83 G, 83 J, 12.1, 12.5; 180/118, 117, 120; 416/130

[56] References Cited

U.S. PATENT DOCUMENTS

| | | | |
|---|---|---|---|
| 2,929,580 | 3/1960 | Ciolkosz | 244/12 D |
| 2,940,698 | 6/1960 | Lawrence et al. | 244/83 G |
| 3,008,524 | 11/1961 | Kaplan | 244/17.23 X |
| 3,486,577 | 12/1969 | Jackes | 244/23 R X |

Primary Examiner—Trygve M. Blix
Assistant Examiner—Barry L. Kelmachter
Attorney, Agent, or Firm—Beveridge, DeGrandi, Kline & Lunsford

[57] ABSTRACT

A wingless vertical take-off aircraft having multiple ducted propeller rotors with controllable pitch blades symmetrically mounted in the forward and the rear portions and on both sides of the aircraft with the ducts angled downwardly at an acute angle to the aircraft longitudinal axis, transversely extending deflector vanes pivotable vertically within the exit portion of the ducts, and a rudder for yaw control mounted in the exit portion of each rearwardly located duct. Control in altitude and in attitude about the pitch and roll axes is achieved by controlling the collective pitch of the propellers in selected ducts with the roll control being interconnected to the yaw control to counteract roll/yaw coupling effects and control in trim and forward flight thrust being provided by setting the position of the deflector vane to divert the air flow from the ducts in variable directions with respect to the aircraft axis and the vertical.

8 Claims, 7 Drawing Figures

FIG.4
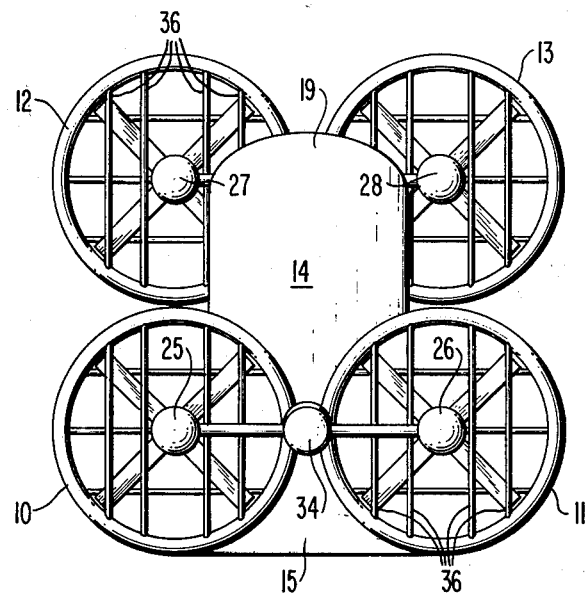
FIG.5
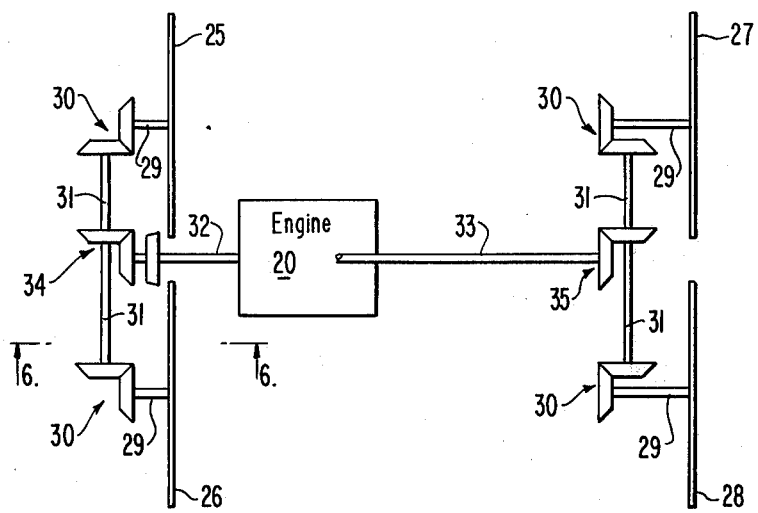
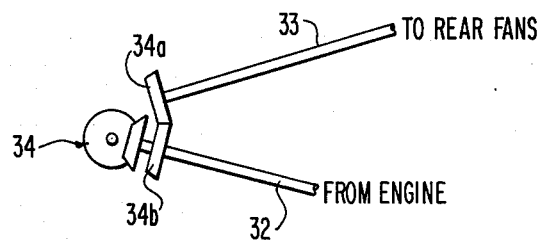
FIG.6

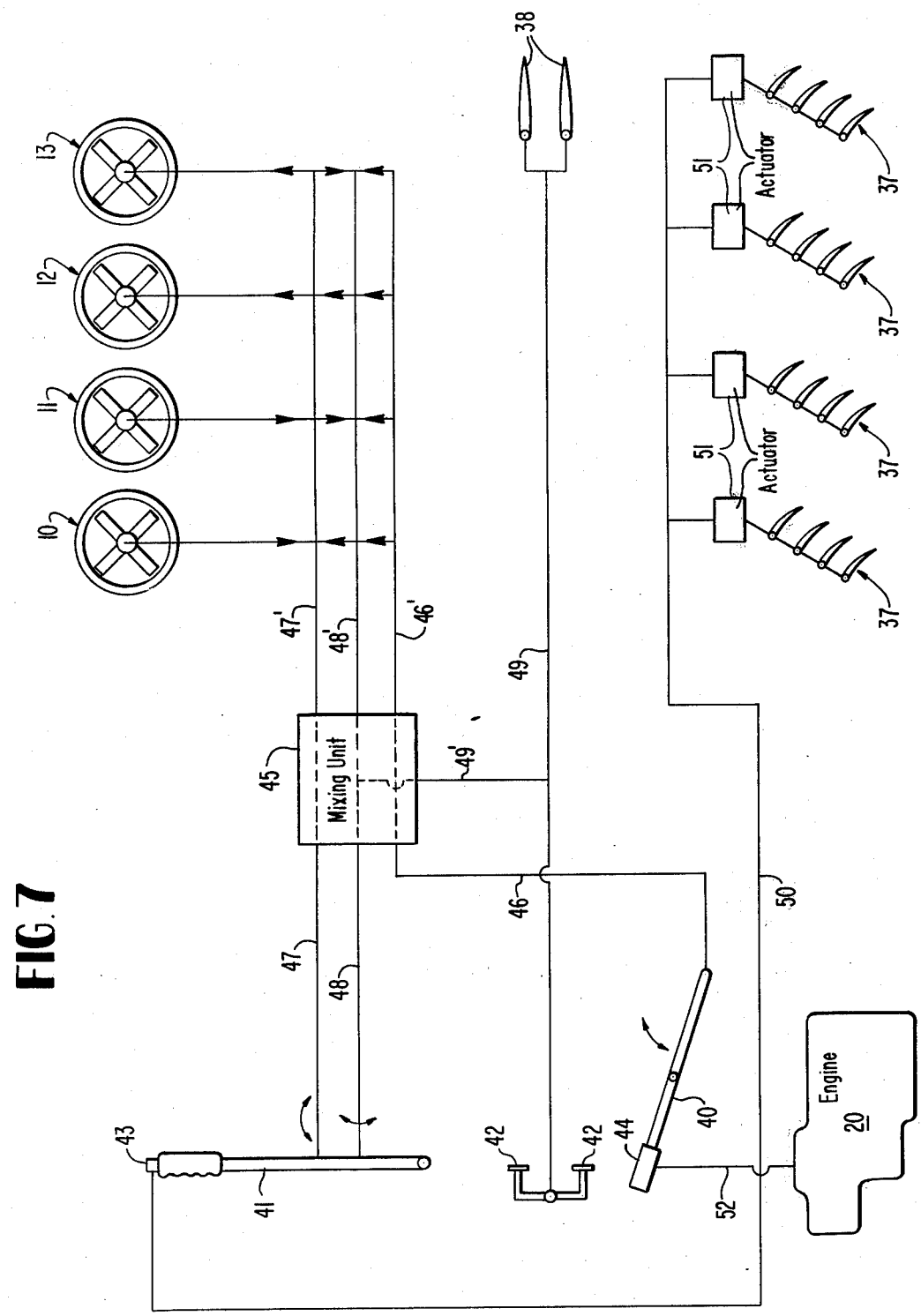

VERTICAL TAKE-OFF AIRCRAFT

BACKGROUND OF THE INVENTION

The present invention relates to a VTOL aircraft, (vertical take-off and landing aircraft) having a thrust-/lift/control system integrated into a plurality of controllable pitch propellers mounted in ducts angled downwardly at an acute angle with respect to the longitudinal axis of the aircraft with vertically pivotable deflector vanes in the duct exits and interconnections between the aircraft altitude and attitude controls and the collective blade pitch actuators of selected propellers.

Many types of VTOL aircraft have been proposed and constructed, the most common of which is the conventional helicopter having one or more lifting rotors, of which the blade pitch is controlled both collectively and cyclically for controlling the attitude and altitude of the aircraft. The physical dimensions of even the smaller-sized helicopters, such as a two-man capacity, are relatively large due to the size of the relatively low RPM rotor blades and blade clearance considerations. A high degree of maintenance is required for conventional helicopters primarily due to the relatively complex nature of the rotor assembly in which each blade must be controllable in pitch cyclically during each revolution as well as collectively during an entire revolution and the resultant vibratory forces that are imposed on the rotor assembly.

A small, compact and readily controllable VTOL aircraft, capable of carrying one or two men, would be highly advantageous in many situations, particularly in military operations. A small, compact VTOL aircraft with a low silhouette would provide increased tactical mobility to infantry forces in gaining access to places that are normally inaccessable to motor vehicles due to water and other terrain problems and are inaccessable to helicopters due to terrain clearance problems and obstructions. Even if the rotor blades of conventional helicopters can be aligned in transporting the helicopter, the length of the blades poses dimension problems when transporting the helicopter in vehicles or other aircraft.

Many of the disadvantages of helicopters can be overcome and compactness achieved by substituting one or more vertically aligned shrouded propellers, or ducted fans, for the slower rotating helicopter rotor blades in obtaining the necessary vertical lift required for a VTOL aircraft. Typical of such a vehicle lift required for a VTOL aircraft. Typical of such a vehicle is the flying platform disclosed in U.S. Pat. 3,184,183. However, a flying platform of the nature disclosed in this U.S. Patent must be pitched forwardly at a substantial angle to establish the forward thrust component necessary for forward flight, which causes a marked drag rise, limits the forward flight speed and also creates problems for the occupants. Although the size indicated for the flying platform of the aforesaid patent is moderately compact, 10 feet 10 inches wide and 24 feet 6 inches long, a considerably more compact size would be highly desirable in a two-man VTOL aircraft. Further, the necessity to control the pitch of the rotor blades of the flying platform both cyclically and collectively requires a moderately complex pitch control mechanism with the attendant maintenance problems common to helicopters.

Ducted propeller or fan arrangements of various configurations have been proposed for VTOL aircraft in taking advantage of the well-known greater static thrust that is available from a given amount of power in a shrouded propeller, or ducted fan, arrangement than in an unshrouded propeller of equal size. Configurations of the ducted fans have been proposed in which the axes of the ducts vary from being parallel to the longitudinal axis of the aircraft to being perpendicular to the longitudinal axis and intermediate angles. In these aircraft the exit area of the ducts have vertically pivotable deflector vanes that can be positioned to direct the air flow from the duct in the direction necessary to obtain the desired components of the vertical and forward thrust to support the aircraft in the desired mode of operation, e.g. hovering, vertical ascent or descent or forward motion. Typical of such arrangements are the configurations shown in U.S. Pat. No. 2,932,468 or 3,486,577. In wingless aircraft of the VTOL type utilizing ducted fans for the necessary lift forces, control forces necessary to establish the necessary attitude and direction of movement of the aircraft have been achieved in a variety of ways. Most commonly used were pivotable, elongated vanes arranged longitudinally and transversely of the aircraft axis in the slipstream of the ducted fan in achieving attitude control. However, establishing adequate attitude control forces in the wingless ducted fan type of VTOL aircraft that will function effectively and efficiently in all modes of flight has posed a problem.

An object of this invention is to provide a readily controllable small, compact VTOL aircraft of maximum efficiency.

A further object of this invention is to provide a compact VTOL aircraft of minimum size and low silhouette able to carry one or two men over natural or man-made obstacles.

Yet another object of the invention is to provide a small, compact VTOL aircraft capable of relatively high forward speed.

A further object of the invention is to provide a compact, small VTOL aircraft which is simple in design and requires a minimum of maintenance attention.

Yet still a further object of the invention is to provide a small and compact VTOL aircraft of the ducted fan type which is highly maneuverable and controllable in all modes of operation.

SUMMARY OF THE INVENTION

The indicated objects have been achieved in a wingless aircraft having a plurality of streamlined ducts integral with the rear and forward portions of a central, compact fuselage structure, equal numbers of ducts being installed on each side of the center line of the fuselage. The center line of the ducts is angled downwardly with respect to the longitudinal axis of the fuselage at an acute angle, preferably less than fifty degrees. A variable pitch propeller driven by one or more engines is mounted in the forward portion of each duct at the minimum cross section. Vertically pivotable deflector vanes extending transversely of the aircraft in the exit areas of each of the ducts to divert the air flow from the ducts in varying angles with respect to the vertical direction as is necessary to establish the vertical and horizontal components of the thrust necessary for the desired mode of flight. Altitude control is achieved by simultaneously varying the collective pitch angle of all propellers. Attitude control in pitch and roll is achieved by differential control of the collective pitch angle of selected propellers and in yaw is achieved by rudders in the ducted propellers slipstreams with interconnections being provided between the roll and yaw controls to counteract roll/yaw coupling effects.

BRIEF DESCRIPTION OF DRAWINGS

FIG. 4 is a front view of the aircraft taken along section line 4—4 of FIG. 2.

FIG. 5 is a schematic plan view of the aircraft transmission system.

FIG. 6 is a schematic view taken along section line 6—6 of FIG. 5.

FIG. 7 is a schematic drawing of the control system.

DESCRIPTION OF A PREFERRED EMBODIMENT

Figure 1:
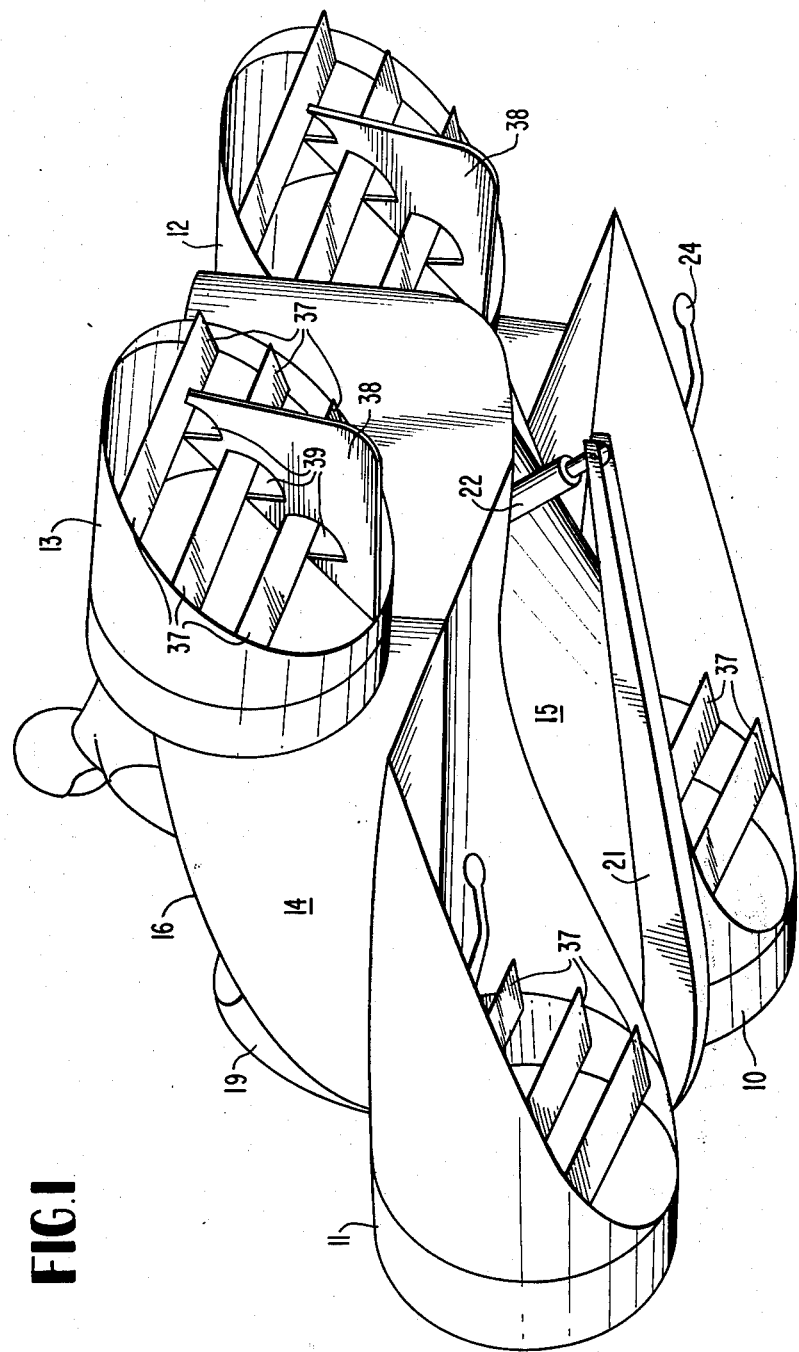
FIG. 1 is a perspective view of a preferred embodiment of the invention from the left, rear underside of the aircraft.

This unique VTOL aircraft, having no wings or conventional lifting rotors, utilizes four small ducted propellers, or fans, that are mounted with center lines angled downwardly at 20° and 30° with respect to the longitudinal axis of the aircraft to provide the thrust required for both vertical lift and forward flight. Four shrouded propeller ducts 10, 11, 12 and 13 of equal minimum internal diameter are integrally formed into both sides of the front and rear portions of the relatively narrow and deep central fuselage structure 14 having a closed underside 15 and open along most of the top portion creating the cockpit 16 within which the seats 17 and 18 are mounted in tandem. The central fuselage 14 is generally streamlined in shape and the front portion can form a protective cowling 19 under which the aircraft power and flight instruments can be mounted ahead of the forward pilot seat 17. An engine 20 is mounted in the lower, central portion of the fuselage below the occupants close to the center of gravity of the aircraft. Although a single engine is shown in this embodiment, obviously a multiple engine installation could be utilized. The forward end of an elongated main central landing skid is pivotally mounted on the forward underside of the fuselage by the pivot pin 22 and the rear end of the main skid is connected to a shock strut 22A mounted on the rear underside of the fuselage, the inflight position of the shock strut being indicated in FIG. 2 by the broken line outline of the strut 21'. Outboard landing skids 23 and 24 are affixed to each of the outboard forward ducts 10 and 11 to protrude below the duct and fuselage structure for lateral support of the aircraft in the landing position in conjunction with the central landing skid 21. The fuselage structure can conveniently be formed from a reinforced plastic skin combined with local reinforcements with the underside having convenient openings for access to the engine, transmission and other components within the fuselage.

A convenient manner of forming the ducts is to integrally mold the inner halves of the ducts into the four corners of the fuselage structure. The outer halves of the ducts 10, 11, 12 and 13 are then affixed to the inboard halves along a vertical center line. Each of the ducts can conveniently be made in the form of a shrouded structure comprising a circumferential torque bending box. The shrouded structure forming the forward ducts 10 and 11 is an elongated streamlined shape faired aft into the structure of the fuselage so as to create a wing area capable of providing additional lift in forward flight and also shield the crew from flying debris in hovering or slow speed. The relatively large internal cavity within the forward ducts 10 and 11 serves as a plenum chamber in the take-off and landing conditions establishing a skirt establishing a greater ground effect lift when the aircraft is near the ground. This elongated plenum chamber can be incorporated into the forward ducts without increasing the overall length of the aircraft. The plenum chamber should preferably extend beyond the leading edges of the rear ducts to prevent the air exiting from it from being ingested into the rear ducts, particularly when operating in ground effect.

Figures 2, 3:
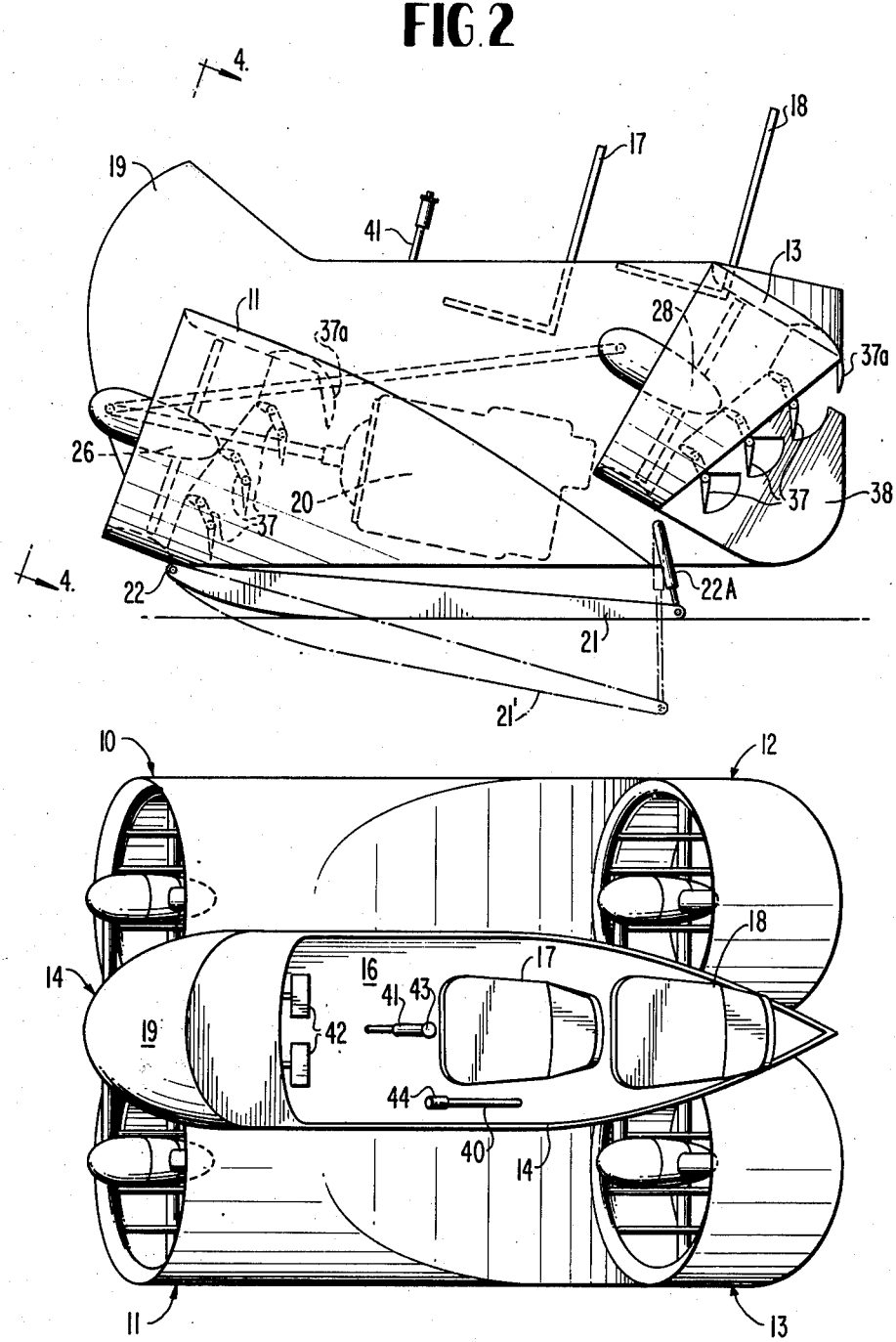
FIG. 2 is a side elevation of the aircraft with some interior structure indicated in dotted lines.
FIG. 3 is a plan view of the aircraft as seen from above.

In the disclosed embodiment the longitudinal center line of each of the forward ducts 10 and 11 is angled downwardly approximately 20° with respect to the longitudinal axis of the fuselage 14 and the center line of each of the rear ducts 12 and 13 is angled downwardly at approximately 30° to the longitudinal axis of the fuselage. These indicated angles of inclination are typical of a configuration which establishes a reasonable tradeoff between the high lift and hovering capability of a vertically mounted ducted propeller and the forward thrust provided by a more horizontally mounted ducted propeller required for forward flight. To avoid extremes between vertical lift and forward thrust capabilities, the ducts should not be inclined more than about 60° or less than about 10° to the longitudinal axis of the aircraft. As can be seen in FIGS. 2 and 3, the rear ducts 12, 13 are in line with forward ducts 10, 11 and located sufficiently above the forward ducts that the forward ducts do not adversely affect the inflow of air into the rear ducts.

Controllable pitch propellers 25, 26, 27, 28 are mounted within the forward portions of each of the shrouded duct structures 10, 11, 12 and 13, respectively. Fixed slots (not illustrated) may be incorporated into the leading edge of each duct to increase the effective radius of the leading edge lip and reduce the duct fixed dimension. The duct exit walls are tapered to provide maximum expansion of the duct aft of the plane of the propellers to increase the effective disc area and decrease the exit velocity of the air. The circular shape of the forward ducts 10, 11 rearwardly of the plane of the propeller is gradually transferred into a rectangular section. As seen in FIG. 5, each multi-blade propeller is mounted on the output shaft 29 leading from a gear box 30 that is connected by cross shafts 31 leading from centrally located gear boxes 34 and 35 the connect to the engine 20 through the engine drive shaft 32 and secondary shaft 33 via the gears 34a and 34b, in the manner indicated in FIG. 6. The propellers of each of the forwardly mounted pair 25 and 26 are rotated in opposite directions as are each of the rearwardly mounted pair 27 and 28 so no torque reaction is normally imposed on the aircraft by the rotating propellers. Obviously the transmission arrangement shown in FIGS. 5 and 6 is one means only of connecting the propellers to the engine and many other transmission arrangements are possible.

The controllable pitch propellers 25, 26, 27, 28 are mounted in the minimum diameter area within the interior of the stream-lined ducts behind guard bars 36 that extend across the entrance openings of the ducts. Rearwardly of the propellers deflection vanes 37 extend across the duct transversely of the aircraft with the leading edge of each deflection vane being pivotally hinged to the duct structure with provisions for rotating the vane upwardly and downwardly at varying angles to the longitudinal axis of the duct. The upper deflection vane 37a can conveniently form a segment of the upper wall of the duct. A vertically extending rudder vane 38 is hinged in the exit areas of each of the two rear ducts 12 and 13 for pivotal movement about a vertical axis, rudder vanes in the forward ducts not being necessary to achieve adequate yawing forces. Since the rear ducts are relatively shallow the rudder vanes 38 are formed with cut-out areas 39 to provide clearance for the vertically movable deflector vanes 37.

Each of the propellers 25, 26, 27 and 28 is a multi-bladed, controllable pitch propeller assembly mounted on the output shaft 29 within each of the four ducts in which the rotating blade pitch control forms a part of the propeller assembly and is actuated by a centrally mounted spider in a conventional manner known to those skilled in the art and which needs no further description. The change in pitch of the blades of each propeller can be established by such well-known mechanisms as an irreversible ball screw jack actuated by the pilot controls through kinematic or other linkage systems.

The controls by which the pilot controls the flight mode and attitude of the aircraft can be the conventional ones normally used in helicopters, supplemented by a control for actuating the deflection vanes. A convenient altitude control is a conventional collective pitch control handle or thrust lever 40 located at the left side of the pilot on the top of which is a twist-grip throttle and governor control 44. Pitch and roll control is exercised by means of a conventional attitude control stick 41 grasped by the pilot's right hand, a trim control in the form of a beep switch 43 being mounted on the top of the control stick 41 to control the position of the deflection vanes. Rudder pedals 42 operable by the pilot's feet establish control of the aircraft in yaw in the conventional manner.

The aircraft altitude control and pitch and roll attitude control are achieved by controlling the pitch angle of the blades of the ducted propellers, either in equal amounts in all propellers or differentially between selected propellers. The disclosed angled quad ducted fan/deflector vane configuration permits a trade-off between the horizontal and vertical components of the thrust of the ducted propellers. Horizontal thrust for forward flight is achieved by a change in the longitudinal attitude of the aircraft or by changing the setting of the deflector vanes, or a combination of both. In forward flight the duct wing effect provides additional vertical lift that compensates for the reduction in the vertical component of the propeller thrust as the aircraft is pitched or deflector vane raised. To establish the hovering condition for the aircraft, the deflector vanes are moved to the full down position illustrated in FIG. 2 in which the slipstream from the propellers is deflected to be directed substantially vertically. Rate of ascent or descent of the aircraft, particularly in the hover condition, is achieved through establishing the necessary pitch angle in the blades of all propellers simultaneously through positioning the thrust lever 40. In order to increase the altitude of the aircraft the collective pitch of all propellers is increased concurrently and conversely, the altitude is decreased by decreasing the collective pitch of all propellers simultaneously as practiced in conventional helicopters. Changes in engine RPM are made through the throttle and governor control 44 on top of the collective pitch handle or thrust lever 40. The engine is controlled by a fuel governor which maintains a constant engine RPM as the power demand changes with change in collective pitch of the propeller blades. Longitudinal and lateral control of the aircraft about the pitch and roll axes are achieved by varying the pitch of the propellers in the selected pairs of various ducts in a differential manner. Differentially actuating the collective pitch angle of the blades of the forward and of the rear ducted propellers produces a longitudinal control moment which will change the attitude of the aircraft about the pitch axis. Differentially actuating the blade pitch angle of the ducted propellers mounted on the right side and on the left side of the aircraft produces a lateral control moment that can change the attitude of the aircraft about the roll axis. Differential control of the pitch of the blades of the ducted propellers is not utilized for yaw control, this being achieved through pivoting the conventional rudders 38 mounted in the exit area of the rear ducts to the position necessary to create the desired yawing moment.

In forward flight when the thrust of the ducts has a large longitudinal component, a differential setting of the pitch of the propellers on each side of the aircraft will not only establish a rolling moment but also produces a secondary yawing moment, since the lateral differential in pitch modulates the longitudinal as well as the vertical components of the duct thrust. Therefore, to reduce or eliminate this roll/yaw coupling effect the secondary yawing moment is counteracted by interconnecting the aircraft roll control and yaw control so that lateral displacement of the control stick 41 produces a small deflection in the rudder normally actuated by the rudder pedals 42. In short compact aircraft of the nature disclosed, displacement of the rudders 38 can produce a secondary rolling moment in addition to the primary yawing moment when the center of pressure is above or below the center of gravity, the latter situation being the embodiment disclosed herein as the vertical component of the yawing moment can be a substantial fraction of the longitudinal moment. The yaw and roll control of the aircraft are interconnected so that displacement of the rudder pedals not only produces a deflection of the rudder but also produces a differential blade collective pitch angle in the left and in the right ducted propellers to counteract this yaw/roll coupling effect. In long aircraft the yawing moment established by the rudder would possibly be sufficiently greater than the secondary rolling moment so that it might not be necessary to apply a counteracting rolling moment through differential pitch control upon actuating the rudders. Table I, following, indicates the nature of the actuation that is applied by the various controls of the aircraft in executing the maneuvers required to control the aircraft in flight:

TABLE I

CONTROL MOTIONS

| Vehicle Motion Desired | Cockpit Control | VEHICLE CONTROL | | | | |
|---|---|---|---|---|---|---|
| | | L. Front Duct Unit | L. Rear Duct Unit | R. Front Duct Unit | R. Rear Duct Unit | Rudders |
| Increase Altitude | Thrust Lever Up | Increase Collective Pitch | Increase Collective Pitch | Increase Collective Pitch | Increase Collective Pitch | — |
| Hover | Trim Control | Vanes full Down | Vanes full Down | Vanes full Down | Vanes full Down | — |
| Forward Flight | Trim Control | Retract Vanes | Retract Vanes | Retract Vanes | Retract Vanes | — |
| Nose Down | Stick Forward | Decrease Collective Pitch | Increase Collective Pitch | Decrease Collective Pitch | Increase Collective Pitch | — |
| Roll Left | Stick Left | Decrease Collective Pitch | Decrease Collective Pitch | Increase Collective Pitch | Increase Collective Pitch | Right Slightly |
| Yaw Right | Right Pedal | Decrease Collective Pitch slightly | Decrease Collective Pitch slightly | Increase Collective Pitch slightly | Increase Collective | Right Deflection |

For reverse maneuvers, control motion in chart are the reverse of that indicated.

FIG. 7 is a schematic illustration of the manner in which the various controls are interconnected in establishing control of the aircraft in flight through conventional helicopter and aircraft mechanically, electrically, hydraulically or pneumatically motivated control systems. The altitude control (collective pitch) and the attitude controls in pitch and roll of the aircraft may be conveniently connected by conventional linkages or electrical connections, represented by the lines 46–50, 52 and 46'–59', to the individual spiders on the hubs of the propeller assemblies contained within the ducts 10, 11, 12 and 13 through a mixing unit 45 which establishes the required angle of pitch of the propeller blades of the respective propeller assemblies. The connection 46 from the collective pitch control or thrust lever 40 through the mixing unit 45 and the output connection 46' establishes simultaneous changes of equal amounts in the collective pitch of the ducted propellers 25, 26, 27 and 28 upon actuation of the thrust control 40. The arrows on the lines leading upwardly to each of the representations of the four propeller ducts 10, 11, 12 and 13 indicate the relative directions of the changes in propeller blade pitch created by movement of the various controls conforming to the control motions tabulated in Table I, in this case the arrows extending upwardly from the collective pitch control connection 46' representing increases in the collective pitch of each of the propellers within the ducts 10, 11, 12 and 13 from upward motion of the thrust lever 40. Similarly, longitudinal motion of the control stick 41 is transmitted by the connection 47 to the mixing unit 45 and the output connection 47' to the collective pitch actuators for the blades of each of the four propellers in the relative directions indicated by the arrows above the connection line 47'. Motion of the control stick 41 in the lateral direction is transmitted by the connection 48 to the mixing unit 45 and the output connection 48' to the collective pitch actuators for the blades of each of the propellers in the directions indicated by the arrows. A connection 49 transmits motion of the rudder pedals 42 to the rudder vanes 38 but includes a connection 49' into the mixing unit 45 which establishes the indicated differential collective pitch changes in the blades of the propellers in the right ducts 10 and 12 and of the propellers in the left ducts 11 and 13 upon movement of the rudders 38. The connection 49' is a dual one and also represents the connection which establishes a slight movement in the rudders 38 upon actuation of the control stick 41 in the transverse direction when applying a rolling moment to the aircraft. The deflector vane or trim control switch 43 atop the control stick 41 has a connection 50 to the actuators 51 which control the position of the deflector vanes 37 in each of the ducts. Likewise the throttle and governor control 44 atop the collective pitch control handle 40 has the connection 52 to the power and governor controls of the engine 20. The mixing unit 45 and the variously numbered connecting lines of FIG. 7 can comprise electrical, hydraulic, pneumatic or mechanical systems of the type conventionally utilized in helicopter rotor control systems which utilize pilot actuated control inputs through electrical, hydraulic, pneumatic or mechanical connections in a suitable mixing unit which is programmed and designed to intermix the incoming signals in a predetermined manner and provide outputs to the devices on the rotors that control the pitch of the blades which produce the desired lifting forces established by the rotating blades of the rotors. Conventional mechanical flight control systems utilized in helicopters, involving such conventional components as non-linear linkages, interaxis mixing assemblies, control boost actuators, power actuators and the like commonly used in aircraft and helicopter control systems, could be utilized to perform the functions described by the units represented by the mixing unit 45 and the variously numbered line connections and actuators illustrated in FIG. 7. More conveniently would be the fly-by-wire electrical system, or DELS system, utilized in the HLH helicopter.

Thus the described configuration of the rectangular, angled quad arrangement of the ducted variable pitch propellers, in conjunction with the deflector vanes, provides a very compact VTOL aircraft in which the ducted propeller thrust is not only available for hovering flight but a large portion is available for forward flight and the collective pitch control of the propellers provides the means for establishing most of the major control forces necessary in controlling the attitude of the aircraft. Placing the deflector vanes in the lower position deflects the slipstream from the ducted propellers substantially vertically downwardly to convert all of the thrust into a lifting component when the aircraft is in a hovering mode. In forward flight the vane deflection is progressively decreased as the air speed increases and as an increasing proportion of the lift for the aircraft is provided by the duct wing effect. The lift produced by the ducted propellers at any given angle of attack is strongly influenced by the amount of air flow through the duct, which is controlled by the pitch angle of the propellers. The deflection of the vanes in conjunction with the collective pitch setting of the propellers may be used to trim the aircraft at any desired attitude for a given air speed. Thus the effect of the deflector vanes is similar to that of the wing flap on a conventional airplane.

Since the pitch of the propeller blades controls the powered thrust being developed in each of the ducts, when the vanes are nearly fully deflected in hovering or slow flight any change in the collective pitch of all of the propellers directly controls the vertical component of thrust being developed in each duct and establishes the rate of ascent or descent of the aircraft. In forward flight the vanes are only partially deflected and the resultant thrust developed in the duct has a progressively lower direct vertical component and a greater longitudinal component. However, since the lift being developed by each duct unit at a specific angle of attack is largely controlled by the thrust being developed in the duct by the propeller and this thrust is controllable by the collective pitch of the propeller, differential collective pitch of the propellers in the respective pairs of ducts will establish pitching and rolling moments by modulation of the lift being established by thrust from each duct assembly. As previously noted, de-coupling the secondary roll and yaw moments on actuation of the primary roll control or the primary yaw control is achieved by interconnecting the yaw control and the differential propeller pitch control utilized in rolling the aircraft.

Although the described embodiment utilizes four ducted propellers in a symetrical rectangular arrangement at the four corners of the fuselage, other symetrical arrangements utilizing the fundamental concept of the invention would be possible with angled ducted propellers located in the forward and rear portions of the aircraft and on each side of the centerline. Although possibly not as efficient as the disclosed quad duct arrangements, a single angled duct could be located aft on the centerline of the aircraft with two angled ducts forward on either side of the centerline. In such an arrangement it would be necessary to balance a torque differential between a larger rear propeller and the smaller forward propellers. This could be done by a differential collective pitch between the forward propellers and also control of the vanes. In larger size aircraft, six or more symetrically arranged ducts could be utilized. However, in all of these possible configurations, attitude control is achieved by differential pitch control of the propellers and yaw and roll control interconnection to de-couple yaw/roll coupling effects.

It should be understood that the foregoing disclosure relates only to a typical embodiment of the invention and that numerous modifications or alterations may be made therein without departing from the spirit and scope of the invention as set forth in the appended claims.

What is claimed is:

1. A wingless vertical take-off and landing aircraft comprising a fuselage having a plurality of separate shrouded propeller ducts integrally mounted on each side thereof, each said duct being inclined downwardly at an acute angle to the longitudinal axis of the fuselage and having a propeller slipstream discharge exit to the atmosphere separate from that of each other duct, a portion of said plurality of ducts being located at the forward end of the fuselage and a portion of said plurality of ducts at the rear end with an equal number of ducts located oppositely on each side of the fuselage longitudinal axis, a propeller having controllable pitch blades mounted for rotation within each said duct, means for controlling the pitch of the blades of each said propeller, power means connected to each said propeller rotating said propellers within their respective ducts establishing said slipstream, a plurality of deflector vanes extending across each said duct transversely of the aircraft rearwardly of the propellers in the duct exit area, means for mounting said vanes for pivotable vertical movement between a raised position in which the chord of each vane is in general alignment with the duct axis and a lowered position in which said chord is angled downwardly at a substantial angle to the duct axis in a manner to direct said propeller slipstream downwardly sufficiently to establish a vertical component of said slipstream of which the momentum thereof sustains the aircraft in the air, a vertically extending rudder surface mounted in the exit area of each said rear duct for pivotal movement about a vertical axis, control means actuatable from a pilot station comprising:
  a. altitude control means for concurrently changing the blade pitch of all said propellers,
  b. hover control means for setting the position of said vanes,
  c. attitude control means comprising (1) aircraft pitching control means operable by a pitching control for differentially changing the pitch of the propellers in said forward and in said rear ducts upon actuation of said pitching control, (2) aircraft roll control means operable by a roll control for differentially changing the pitch of the propellers in said ducts on opposite sides of said aircraft upon actuation of said roll control, (3) aircraft yaw control means operable by a yaw control for controlling the position of said rudder surfaces upon actuation of said yaw control, and (4) means interconnecting said roll and yaw control means for moving said rudder surfaces as will establish a de-coupling yawing moment upon actuation of said roll control.

2. The aircraft of claim 1 additionally comprising means interconnecting said yaw and roll control means actuating said roll control means for differentially changing the pitch of said propellers on opposite sides of said aircraft as will establish a de-coupling rolling moment upon actuation of said yaw control.

3. The aircraft of claim 2 wherein said ducts are inclined between 10° and 60° with respect to said fuselage longitudinal axis.

4. The aircraft of claim 3 wherein a first pair of ducts are mounted on each side of the forward end of said fuselage and a second pair are mounted in the rear of said fuselage with the ducts of each of said second pair in line with and vertically above said forward pair such that a projection of the cross section of each duct of said second pair is above the respective duct of said first pair to avoid interference of air flow into the intake of said second pair of ducts.

5. The aircraft of claim 4 wherein the angle of inclination of said second pair of ducts is greater than that of said first pair of ducts.

6. The aircraft of claim 4 wherein the upper portion of the wall of each of said first pair of said ducts is elongated and faired into the fuselage to extend along said fuselage at least as far along the length of the underside of said fuselage as a point below and behind the entrances to the rear ducts with the lower portion of said duct wall extending to the level of the bottom of the fuselage and being open on the underside from closely adjacent the lowermost vane mounted therewithin to the rear end of the duct to form a plenum chamber establishing an increased ground effect at take-off and landing.

7. A method of controlling the flight path and attitude of a wingless VTOL aircraft deriving its vertical lift primarily from the thrust of shrouded propellers each rotating within a plurality of separate ducts mounted in the front and rear of the aircraft and in equal numbers on opposite sides of its centerline with the ducts aligned in a direction establishing an acute angle below the longitudinal axis of the aircraft and each duct having a separate propeller slipstream discharge exit to the atmosphere, said method comprising the steps of deflecting the slipstream from the shrouded propellers downwardly at such an angle as will establish the vertical and horizontal components of slip-stream momentum required to sustain the aircraft in flight at the desired forward velocity, changing the collective pitch of all propellers simultaneously in equal amounts to change altitude, changing the collective pitch of the propellers mounted forwardly of the aircraft center differentially from the propellers mounted rearwardly of the aircraft center to rotate the aircraft about its pitch axis, changing the collective pitch of the propellers mounted on the right side of the longitudinal centerline of the aircraft differentially from the propeller pitch on the left side of said longitudinal centerline to rotate the aircraft about its roll axis, deflecting the slipstream of the most rearwardly located propellers an amount transversely of the aircraft centerline to rotate the aircraft about its yaw axis, and upon applying said differential change in the collective pitch of the propellers on each side of the aircraft centerline to rotate the aircraft about its roll axis concurrently deflecting the slipstream of the most rearwardly located propellers transversely of the aircraft centerline in a direction and amount as will establish a de-coupling yawing moment about the aircraft yaw axis.

8. The method of claim 7 additionally comprising the step of concurrently differentially changing the pitch of propellers on opposite sides of said aircraft centerline as will establish a de-coupling rolling moment about the aircraft roll axis upon establishing said deflection of the slipstream of the most rearwardly located propellers to rotate the aircraft about its yaw axis.

* * * * *